P. MUELLER.
CLEAN-OUT FERRULE FOR DRAIN OR SOIL PIPES.
APPLICATION FILED JULY 8, 1912.

1,060,693.

Patented May 6, 1913.

2 SHEETS—SHEET 1.

Inventor
Philip Mueller

Witnesses

By Meyers Cushman Rea
Attorney

P. MUELLER.
CLEAN-OUT FERRULE FOR DRAIN OR SOIL PIPES.
APPLICATION FILED JULY 8, 1912.
1,060,693.
Patented May 6, 1913.
2 SHEETS—SHEET 2.
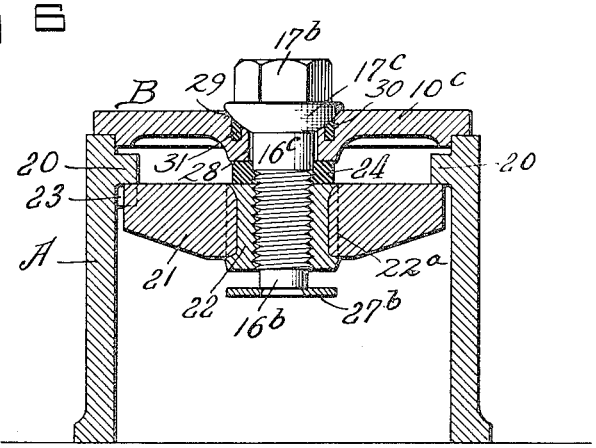
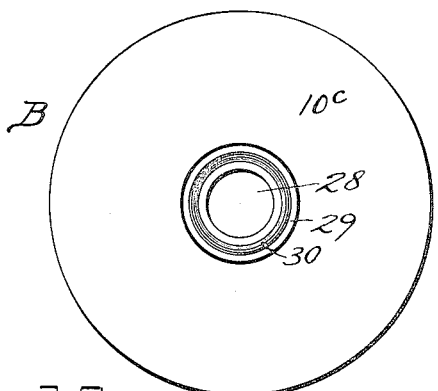
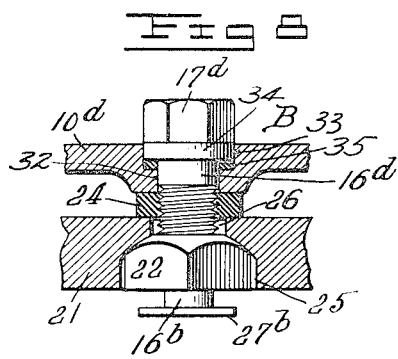
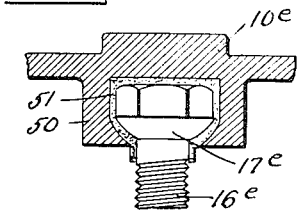
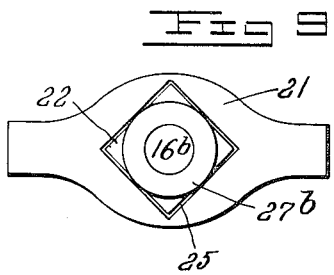
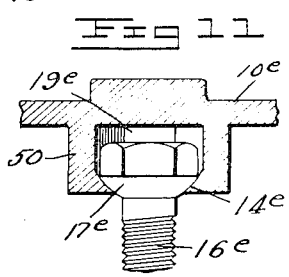
WITNESSES
INVENTOR
Philip Mueller

UNITED STATES PATENT OFFICE.

PHILIP MUELLER, OF DECATUR, ILLINOIS, ASSIGNOR TO H. MUELLER MFG. CO., OF DECATUR, ILLINOIS, A CORPORATION OF ILLINOIS.

CLEAN-OUT FERRULE FOR DRAIN OR SOIL PIPES.

1,060,693.      Specification of Letters Patent.      Patented May 6, 1913.

Application filed July 8, 1912. Serial No. 708,290.

*To all whom it may concern:*

Be it known that I, PHILIP MUELLER, a citizen of the United States, residing at Decatur, in the county of Macon and State of Illinois, have invented new and useful Improvements in Clean-Out Ferrules for Drain or Soil Pipes, of which the following is a specification.

This invention relates generally to cap closures and means for holding them in place, and particularly to closures for clean-out ferrules as applied to drain and other pipes.

In practice, clain-out ferrules and other parts to be covered are made with closure caps screwed directly thereinto or through the medium of a bolt and yoke which, in order to get a tight joint between the closure and the part to be closed, require machining or other means of fitting, and, unless the several parts are carefully made and fitted it is sometimes difficult to place the closures properly over the openings so that the bolts will aline with the threaded bolt holes.

The object of this invention, therefore, is to provide a closure with a depending fastening bolt which can always be screwed into the threaded hole in a nut provided for it irrespective of any slight irregularities in, or lack of parallelism between the seats for the closure and the nut carrier. This object I attain by mounting either the bolt or the nut therefor on a seat of such shape that one or the other may move on its support to bring their respective axes in line and so retain them, notwithstanding the lack of parallelism between their respective supports, while being screwed together.

Figure 1:
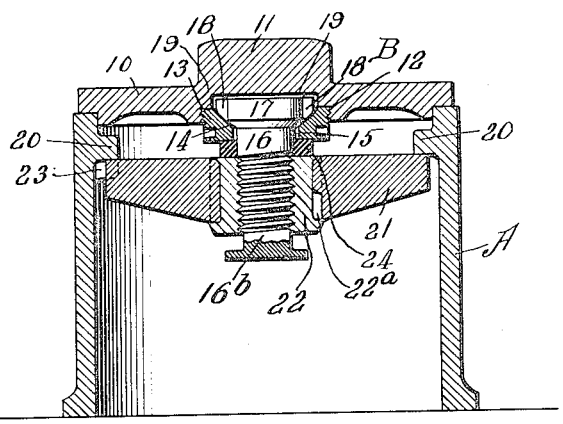
Figure 2:
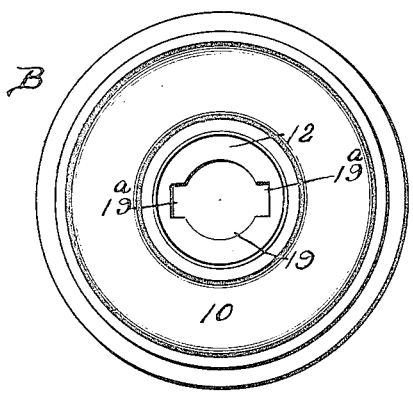
Figure 4:
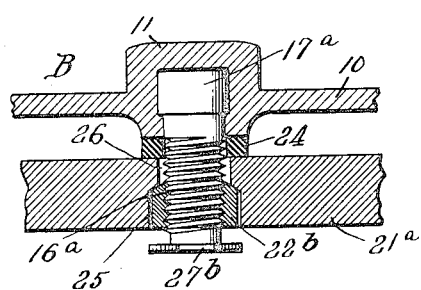
Figure 3:
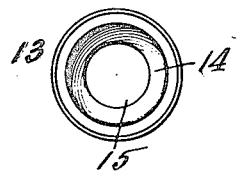
Figure 5:
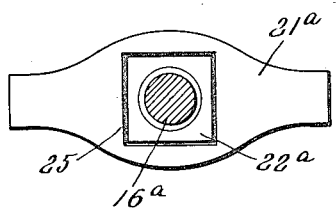

In the accompanying drawing which is illustrative only of the invention and shows it applied to a clean-out ferrule and its closure; Figure 1 is a vertical sectional view of a clean-out ferrule and its cap closure secured in place by the improved fastening. Fig. 2 is a bottom plan view of the cap closure. Fig. 3 is a top view of a detail of the invention. Fig. 4 is a detail sectional view showing a modification of the fastening. Fig. 5 is a bottom view of the modification shown in Fig. 4. Fig. 6 is a view similar to Fig. 1 showing another modification of the invention. Fig. 7 is a top plan view of the closure illustrated in Fig. 6. Fig. 8 is a sectional view of still another modified form of the invention. Fig. 9 is a bottom view of the bridge piece or cross-bar used with the modified type of the device illustrated in Fig. 8. Fig. 10 is a sectional view illustrating a different manner of flexibly joining the fastening bolt to the cover plate of the closure. Fig. 11 is a similar view of a portion of the cap closure and the fastening bolt illustrated in Fig. 10 in position for use.

In the drawing, A designates a clean-out ferrule of known type and B its cap closure comprising a plate 10, preferably circular, formed with a shouldered edge to engage the top of the ferrule A and a lug 11 projecting upwardly from the center of the plate 10 which lug is preferably of polygonal shape to receive a tool for rotating the closure. In the under side of the plate 10 beneath the lug 11 is a circular recess 12, threaded to receive a bolt sustaining member 13 which is screwed tightly in said recess. Continuous with the recess 12 within the plate 10 is a smaller circular recess 19 formed with oppositely placed indentations 19$^a$ for a purpose to be described later. Within the member 13 and opening upwardly is a concave seat or depression 14 from the bottom of which a round hole 15 extends through the member 13 for the passage of a bolt 16 by means of which the cap closure B is held in place on the ferrule. Projecting diametrically from the head 17 of the bolt on opposite sides are two lugs 18 which enter the lateral indentations 19$^a$, continuous with the smaller circular recess 19, which grasp the lugs and rotate the bolt when the closure is turned. The floor of the depression 14 is concave as previously stated to form a seat for the complementarily curved under side of the bolt head 17 and its lugs 18, so that the bolt may rock to a limited extent in any direction, the head of the bolt fitting loosely in its seat and in the recess 19 to permit this. The end 16$^b$ of the bolt 16 is preferably reduced in diameter and upset or spread, to prevent the nut 22 and bridge piece 21 from running off the thread and dropping into the pipe below the ferrule, or a washer 27$^b$ may be riveted on the end of the bolt, see Fig. 6.

Within the ferrule A, below its upper edge and oppositely disposed with relation to each other are two studs 20 against the under sides or shoulders of which the ends of a bridge piece or cross bar 21 bear, said bridge preferably having inserted therein a nut 22, made of a non-corrodible material, such as brass, into which the bolt 16 is screwed to hold the closure in place. The nut 22 may be inserted in the bridge or crossbar 21 after the latter has been cast, or it may be placed in the mold and the metal forming the bridge poured around it, lugs or serrations 22$^a$ on the outside of the nut prevent it rotating in the bridge. The threaded opening may, if desired, be formed directly in the bridge or cross bar and the nut omitted, the bolt in this instance being made of a non-corrodible metal.

The closure B is secured in place on the ferrule by running the cross-bar 21 downwardly on the bolt sufficiently far to permit the cross-bar dropping below the studs 20 when placed in the ferrule and before the closure is seated. The closure or bolt is then turned until the bridge passing beneath the studs 20, abuts against stops 23 on the sides of the studs and holds the bridge piece beneath the same. The closure and bolt are now rotated until the closure bears firmly on the top of the ferrule A and the bridge against the bottom or shoulders of the studs 20. Should the studs not be parallel with the top of the ferrule A and cause the bridge to tilt slightly, the bolt 16, because of its rocking or universal connection with the closure, will swing out of the axial line of the ferrule sufficiently far to compensate for the lack of parallelism and can be screwed into the nut 22 without applying undue force. A yielding washer 24 is placed between the nut 22 and the bolt sustaining member 13.

Instead of movably connecting the bolt to the closure B it may be fixed therein as shown in Fig. 4. In this form of the invention the bolt 16$^a$ has its head 17$^a$ rigidly affixed in a socket in the closure B or connected thereto by molding the metal around said head while the bolt is in the mold. The bridge 21$^a$ has a recess 25 in its underside to receive a nut 22$^b$ fitting loosely therein, the top of which is spherically formed to bear against the concave upper surface of said recess. A hole 26 is formed through the bridge piece from the recess, through which the bolt 16$^a$ passes to engage the nut. To prevent the nut dropping off the bolt 16$^a$ when unscrewed, a spider or washer 27$^b$ is fastened on the end of said bolt as indicated. This form of closure is secured in place in the same manner as the preferred form, the nut 22$^b$, however, rocking on its seat instead of the bolt head to any irregularities. It can be easily understood how both bolt and nut may be made movable by merely substituting the yoke 21$^a$ and nut 22$^b$ for the yoke 21 with its fixed nut, in the form of the invention represented in Fig. 1.

Another modification of the invention is illustrated in Figs. 6 and 7, and as there shown the clean-out ferrule A is covered by a closure B formed of a plate 10$^c$ having a central opening 28 therethrough for the passage of a bolt 16$^c$ formed with polygonal head 17$^b$ outside the closure and having a collar 17$^c$ just under the head, the periphery of which collar is curved downwardly and inwardly to the body of the bolt 16$^c$ and is seated in a circular concave depression 29 formed in the top of the closure B concentric with the opening 28 therethrough. From this it will be seen that by applying a tool to the head 17$^b$, the screw 16$^c$ will be rotated and at the same time because of the manner of seating the collar 17$^c$ in the closure the screw 16$^c$ may swing laterally in any direction about the axis of the closure. To provide a gas, air or water tight joint between the closure B and the collar 17$^c$, an annular concentric recess 30 is machined or cast in the closure concentric with the opening 28 and opening into the concave depression 29. Within this recess is placed an annular gasket or rubber or other suitable material 31 against which the collar 17$^c$ bears when the screw is tightened and thus forms a perfectly tight joint. Screw threaded on the bolt 16$^c$ is a nut 22 mounted in a bridge piece 21 similar to that shown in Fig. 1, between which nut and the underside of the closure is a rubber gasket 24 which surrounds the screw and such portion of its thread as may project above the washer and forms thereby a fluid tight casing for the thread to prevent corrosion by gas or water. The clean-out ferrule A is provided interiorly with studs 20 and stops 23 against which the bridge piece 21 bears when the screw is rotated to seat the closure in place on the ferrule in a manner similar to that hereinabove described. A washer 27$^b$ is shown attached to the reduced lower end of the screw 16$^c$ to prevent the nut 22 and bridge piece 21 dropping off should the screw be turned too far.

The modification illustrated in Figs. 8 and 9 shows a central opening 32 in the closure B for the passage of the screw 16$^d$ said opening being counterbored on its exterior side as at 33 into which the circular lower part 34 of the head 17$^d$ enters for the purpose of compressing an annular gasket 35 seated in the counterbore to form a fluid tight joint between the gasket and the screw. The screw 16$^d$ is threaded into a nut 22 seated in a recess 25 on the underside of the bridge piece 21 in a manner similar to that shown in Fig. 4. The top of the nut 22 is convex and bears against the top of the recess 25 which is made concave to form a seat for the top of the nut. An opening 26 extends through the bridge 21 for the passage of the screw 16$^d$. As in the other forms of the device a rubber gasket surrounds the screw 16$^d$ between the closure and the bridge 21 which is compressed when the screw is turned to prevent gas or water from reaching the screw and corroding the same.

A further modification of the invention is set forth in Figs. 10 and 11. In this form of the invention the fastening bolt 16ᵉ is formed with a convex shoulder 17ᵉ below its head, said head and shoulder fitting loosely within a socket 19ᵉ formed in the under side of the cover plate 10ᵉ or within a boss 50 projecting from the under side of said cover plate. The side walls of the socket 19ᵉ are shaped to conform with the head of the bolt 16ᵉ so as to rotate the bolt when the plate is turned, the socket, however, is made slightly larger so that the head of the bolt may rock therein. The bottom of the socket 14ᵉ is concaved and of the same radius as the shoulder 17ᵉ which latter bears on the concave bottom to enable the cover plate and bolt to rock relatively to each other. To place the head of the bolt within the socket 19ᵉ, the bolt head, shoulder 17ᵉ and a short length of the stem of the bolt are covered with a thin layer 51 of molding sand or other suitable material, and said parts inserted in the mold wherein the cover plate is formed before the latter is cast. After the metal has been poured and the plate removed from the mold the latter and the bolt will present the appearance represented in Fig. 10. It is only necessary to break away or remove the molding sand or other material 51 which will let the shoulder 17ᵉ fall on the concave surface 14ᶜ as in Fig. 11. It is to be understood that the sand or other material 51 placed around the bolt head will be in a thin layer, only enough of such material being used as will prevent the melted metal from adhering to the bolt head.

What I claim is:

1. Combined with an open body and a closure therefor having a circular recess in its under side and a smaller recess continuous with the circular recess, a bolt sustaining member screwed into said circular recess and formed with a concave depression in its upper side, a bolt the head of which is freely fitted into the smaller recess in the closure and shaped to prevent turning therein, the under surface of the bolt head being convex to permit rocking in the concave depression in the sustaining member, and means threaded on said bolt to interlock with said body for holding the closure in place on the body.

2. Combined with an open body and a closure therefor having a circular recess in its under side and a smaller recess continuous with the circular recess, a bolt sustaining member screwed into said circular recess and formed with a concave depression in its upper side, a bolt the head of which is freely fitted into the smaller recess in the closure and provided with radial lugs to engage indentations extending laterally from said smaller recess to prevent independent rotation of the bolt, the under surface of the bolt head being convex to permit rocking in the concave depression in the sustaining member, and means threaded on said bolt to interlock with said body for holding the closure in place on the body.

3. Combined with a rotatable closure and an open body to be closed, a headed bolt having oppositely disposed lateral projections fitting loosely into a similarly shaped recess in said closure, the under-surface of the head and said projections being spherically curved, a bolt sustaining member screwed into said closure below the bolt head and formed with a depression similar in curvature to the under side of the bolt head to permit the bolt to rock therein, and a bridge piece threaded to receive the bolt and adapted to engage studs within the open body to prevent rotation of said bridge piece and lock the closure in position.

4. A closure for an open body to be closed comprising a plate, a threaded stem carried centrally on one side of said plate and adapted to rock in said plate to a limited extent, and to rotate when the plate is turned.

5. A closure for an open body to be closed provided with a central, circular recess on its under side, and a smaller non-circular recess continuous therewith, a bolt sustaining member threaded in said circular recess and provided with a concave depression on its upper side and an opening from said depression through said member, and a bolt extending through said opening formed with a head of similar shape to that of the smaller recess into which it loosely fits, the underside of said head being spherically curved to seat in the concave depression in the sustaining member, whereby said bolt may rock to a limited extent with respect to the closure but rotate with said closure.

6. A closure for an open body to be closed, said closure provided with a securing bolt projecting from the side adapted to overlie the body and extend within the same the head of which bolt is mounted in the closure to permit the bolt to swing to a limited extent in any direction around the axis of the closure, and means to lock the bolt against rotation relative to said closure.

7. A closure for an open body to be closed, said closure provided with a securing bolt projecting from the side adapted to overlie the body and extend within the same the head of which bolt is mounted in the closure to permit the bolt to swing to a limited extent in any direction around the axis of the closure, lugs on the head of said bolt to engage the recesses in said closure and prevent rotation of said bolt in said closure and a fastening means threaded on said bolt adapted to lie within and engage the body and lock the closure in position when one of the threaded parts is rotated.

8. A closure for clean-out ferrules comprising a cap plate having a central recess therein provided with a concaved seat and an irregularly shaped wall, a threaded bolt having its head seated in said recess upon said concaved seat and in engagement with said irregular wall to permit rocking of said bolt but hold it against rotation relative to said plate, and a bridge piece threaded on said bolt.

9. Combined with a closure and an open body to be closed, a threaded stem carried by said closure, and a bridge piece adapted to interlock with said body and carrying a nut for the stem, one of said threaded members having a rocking connection with its carrier and provided with means to prevent its rotation relative to said carrier.

10. A closure for clean-out ferrules comprising a plate, a threaded stem carried centrally of said plate and adapted to rock therein, and an interlocking connection between said plate and stem to prevent rotation of the parts relative to each other.

In testimony whereof I have hereunto set my hand in presence of two subscribing witnesses.

PHILIP MUELLER.

Witnesses:
JAMES W. SIMPSON,
CATHERINE E. McKEOWN.